a) United States Patent
Tiefenbach et al.

(10) Patent No.: US 10,690,580 B2
(45) Date of Patent: Jun. 23, 2020

(54) SENSOR FOR DETECTING PARTICLES

(71) Applicant: Robert Bosch GmbH, Stuttgart (DE)

(72) Inventors: Andy Tiefenbach, Vaihingen-Horrheim (DE); Christopher Holzknecht, Stuttgart (DE); Enno Baars, Leonberg (DE); Frank Freikamp, Ditzingen (DE); Michael Bessen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 15/321,036

(22) PCT Filed: May 29, 2015

(86) PCT No.: PCT/EP2015/061981
§ 371 (c)(1),
(2) Date: Dec. 21, 2016

(87) PCT Pub. No.: WO2016/000877
PCT Pub. Date: Jan. 7, 2016

(65) Prior Publication Data
US 2018/0217045 A1  Aug. 2, 2018

(30) Foreign Application Priority Data
Jul. 2, 2014 (DE) .................. 10 2014 212 858

(51) Int. Cl.
*G01N 15/06* (2006.01)
*F01N 13/00* (2010.01)
*G01N 15/00* (2006.01)

(52) U.S. Cl.
CPC ....... *G01N 15/0656* (2013.01); *F01N 13/008* (2013.01); *G01N 15/06* (2013.01);
(Continued)

(58) Field of Classification Search
CPC .......... G01N 15/0656; G01N 15/0606; G01N 15/06; G01N 2015/0046; F01N 13/008; F01N 2560/05
See application file for complete search history.

(56) References Cited

U.S. PATENT DOCUMENTS 6,202,469 B1 * 3/2001 Nakamura ......... G01N 27/4077
73/114.73
6,948,353 B2 * 9/2005 Toguchi ............. G01N 27/4077
204/424
(Continued)

FOREIGN PATENT DOCUMENTS

CN 101680854 A 3/2010
DE 102006046837 A1 4/2008
(Continued)

OTHER PUBLICATIONS

International Search Report dated Sep. 8, 2015, of the corresponding International Application PCT/EP2015/061981 dated May 29, 2015.

*Primary Examiner* — Xin Y Zhong
(74) *Attorney, Agent, or Firm* — Norton Rose Fulbright US LLP; Gerard A Messina

(57) ABSTRACT

A sensor for detecting particles, in particular, soot particles, is described. The sensor includes a sensor element having at least two measuring electrodes, which are situated on a carrier substrate, and a protective tube assembly having at least one outer protective tube and one inner protective tube. The sensor element is situated in the inner protective tube in a longitudinal extension direction. The outer protective tube and the inner protective tube are designed to permit the particles to access the sensor element in a direction deviating from the longitudinal extension direction.

11 Claims, 4 Drawing Sheets

(52) U.S. Cl.
CPC ...... *G01N 15/0606* (2013.01); *F01N 2560/05* (2013.01); *G01N 2015/0046* (2013.01)

(56) References Cited

U.S. PATENT DOCUMENTS

| | | | |
|---|---|---|---|
| 2003/0019280 A1 | 1/2003 | Toguchi et al. | |
| 2008/0073209 A1* | 3/2008 | Yamada | G01N 27/4071 204/424 |
| 2012/0103057 A1* | 5/2012 | Kimata | G01N 15/0656 73/23.33 |
| 2012/0312074 A1* | 12/2012 | Allmendinger | G01N 15/0656 73/23.31 |
| 2012/0324981 A1* | 12/2012 | Hedayat | G01N 15/0656 73/23.33 |
| 2014/0305188 A1* | 10/2014 | Kume | G01N 27/4077 73/23.2 |

FOREIGN PATENT DOCUMENTS

| | | |
|---|---|---|
| DE | 102012217428 A1 | 3/2014 |
| DE | 102012025078 A1 | 6/2014 |

\* cited by examiner

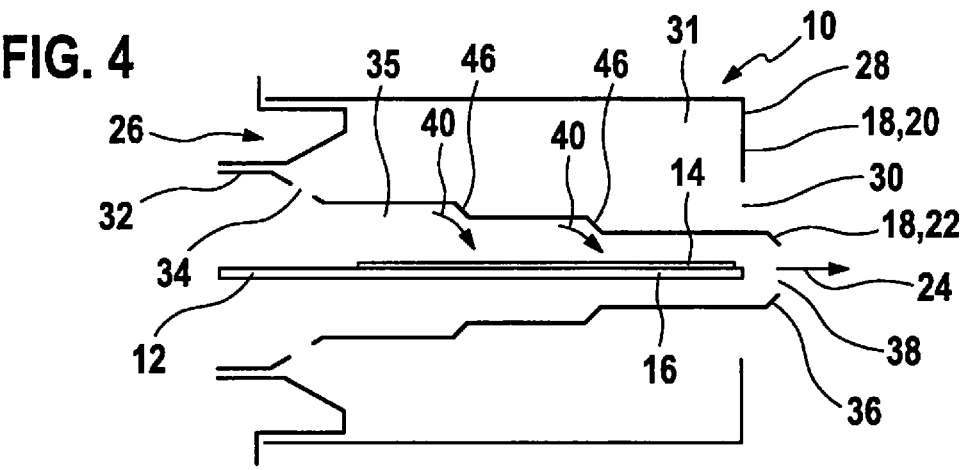
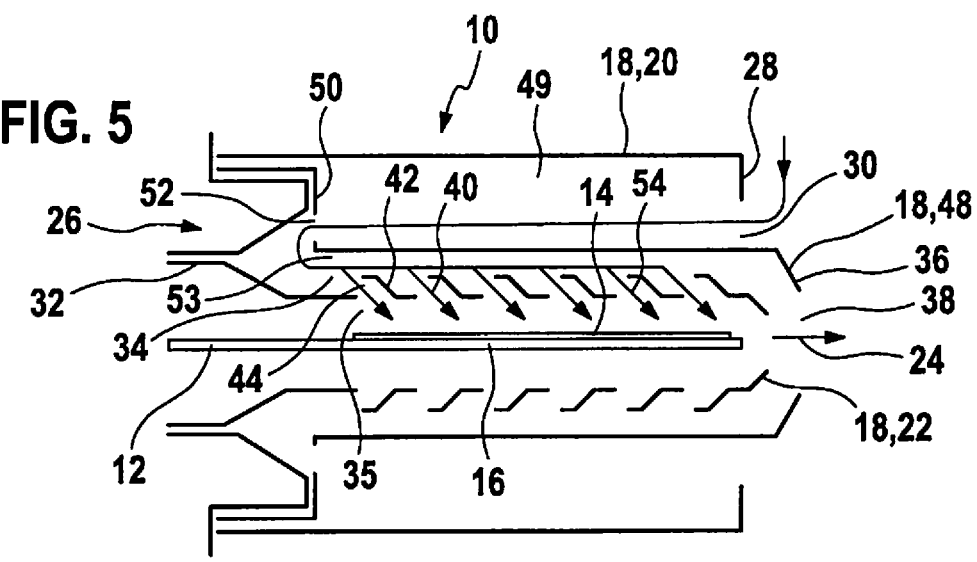
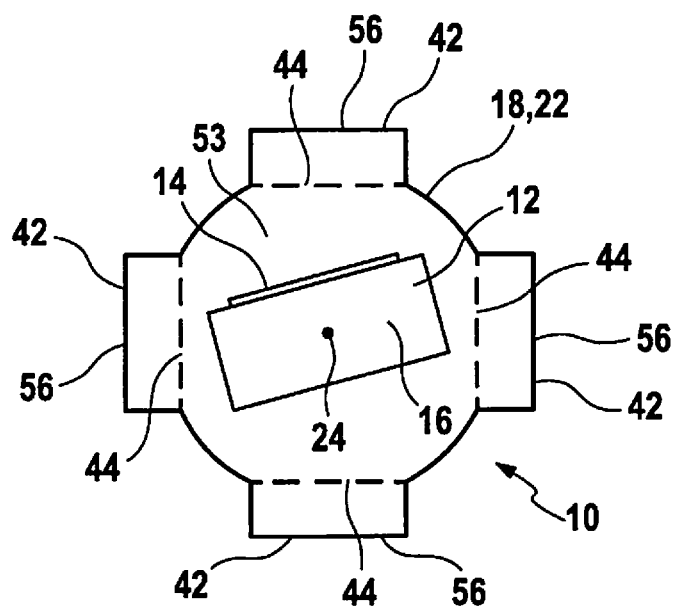

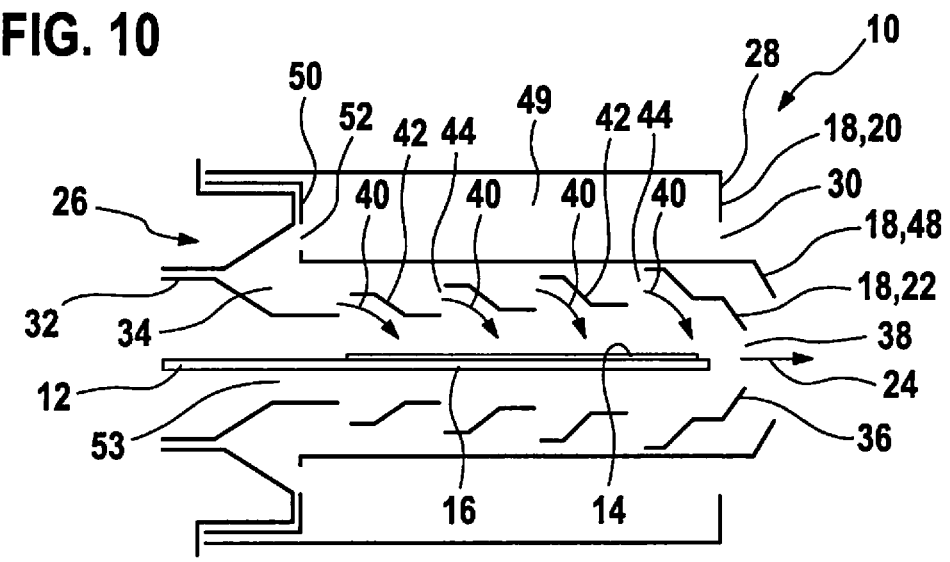
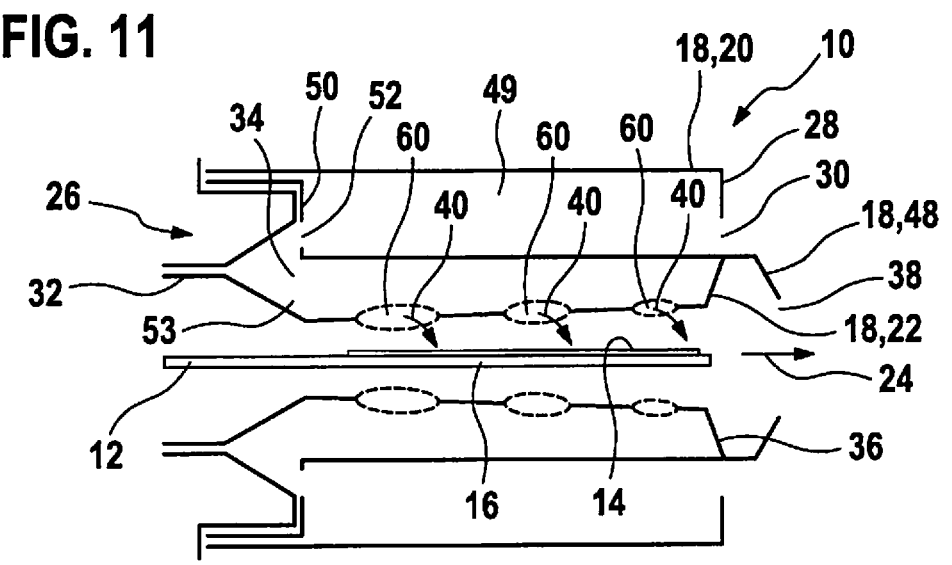

SENSOR FOR DETECTING PARTICLES

BACKGROUND INFORMATION

Numerous conventional methods and devices are available for detecting particles such as, for example, soot or dust particles.

The present invention is described below, without limitation to additional specific embodiments and specific applications, in particular, with reference to sensors for detecting particles, in particular, soot particles in an exhaust gas flow of an internal combustion engine.

Conventionally, a concentration of particles is measured, for example, soot particles or dust particles in an exhaust gas, with the aid of two electrodes which are situated on a ceramic. This may take place, for example, by measuring the electrical resistance of the ceramic material separating the two electrodes. More precisely, the electrical current is measured, which flows between the electrodes when a voltage is applied to them. The soot particles accumulate between the electrodes due to electrostatic forces and in time form electrically conductive bridges between the electrodes. The more of these bridges that are present, the more the measured current increases. Thus, an increasing short circuit of the electrodes is formed.

Such sensors are employed, for example, in an exhaust gas system of an internal combustion engine such as, for example, a diesel-type combustion engine. These sensors are normally located downstream from the outlet valve or of the soot particle filter.

Despite the numerous advantages of the conventional devices for detecting particles, they still have the potential for improvement. The particle sensor is used to determine the soot mass in the exhaust gas tract for monitoring diesel particle filters. The sensor includes a ceramic sensor element, which is surrounded by a protective tube. The ceramic sensor element includes an electrode system, which is used to measure the soot on the basis of its electrical conductivity. The protective tube is used for, among other things, guiding a flow of the measuring gas along the soot-sensitive surface of the sensor element. A protective tube design frequently pursued is based on a dual protective tube, i.e., an outer protective tube and an inner protective tube. An angular independence of the sensor is achieved by an annular gap as an exhaust gas inlet gap between the outer protective tube and the inner protective tube, since the inflowing exhaust gas is uniformly distributed over the space between inner and outer protective tube. The exhaust gas inlet into the inner protective tube is formed in such a way that a preferential flow in the direction of the seal packing is achieved. The exhaust gas entering into this area must then flow longitudinally along the sensor element in the direction of the outlet due to the funnel-shaped design of the inner protective tube. In this way, the protective tube creates a uniform flow over the sensor element in a longitudinal extension direction of the sensor element along the main electrode device while the angular dependence is simultaneously reduced.

The disadvantage of this uniform, laminar flow-over is that although many soot particles skim past the electrode system, the electrode system is not necessarily fully charged with particles. Only particles, which flow in layers close above the electrode surface, experience sufficiently strong attraction forces as a result of electrophoresis and thermophoresis perpendicular to the main flow direction and are thus attracted and form successive soot paths. However, this occurs only in layers close to the electrode surface. If the electrical field is strong enough, an attraction rapidly occurs and the particles no longer move far in the longitudinal extension direction of the sensor element, but land instead on the electrode system. All of the particles in higher layers—the distance between the electrode surface and the inner protective tubing amounts to a few millimeters—however, experience no forces or only very weak forces perpendicular to the direction of flight and therefore skim completely past the electrode system and leave the protective tubing again. Hence, these particles do not contribute to the measurement effect. If, on the other hand, an attraction does occur, it happens very rapidly and only the front area of the electrodes are acted upon. Hence, the available electrode surface is not fully utilized.

SUMMARY

In accordance with the present invention, a sensor for detecting particles, in particular, soot particles is provided, which at least largely avoids the disadvantages described above, and in which the flow guidance for the particles is improved in such a way that, regardless of the external conditions such as, for example, the operating point of the internal combustion engine, the sensor element is flowed over invariably from the same direction and, in particular, the entire surface of the soot-sensitive electrode system is preferably uniformly acted upon by particles. An advantageous flow over the electrodes in this case along the main direction of the electrode system is to be maintained.

A sensor according to an example embodiment of the present invention for detecting particles, in particular, soot particles, includes a sensor element having at least two measuring electrodes, which are situated on a carrier substrate, and a protective tube assembly including at least one outer protective tube and one inner protective tube. The sensor element is situated in a longitudinal extension direction in the inner protective tube. The outer protective tube and the inner protective tube are designed to permit the particles to access the sensor element. The inner protective tube is designed to permit particles to access the sensor element in a direction deviating from the longitudinal extension direction.

The inner protective tube may include flaps, which protrude in the direction of the sensor element. The inner protective tube may include openings adjacent to the flaps. The flaps may be angled with respect to the longitudinal extension direction. The sensor may also include a sensor housing. The sensor element may project from the sensor housing in the longitudinal extension direction. The flaps may vary in length. The length of the flaps may increase away from the sensor housing in the longitudinal extension direction. The flaps may be situated on a section of the inner protective tube, which faces the measuring electrodes. The sensor may also include a sensor housing. The sensor element may project from the sensor housing in the longitudinal extension direction. The inner protective tube may taper away from the sensor housing in the longitudinal extension direction. The inner protective tube may taper uniformly or non-uniformly, in particular, in steps. The sensor may also include a middle protective tube, which is situated between the outer protective tube and the inner protective tube. The inner protective tube may have openings with different opening areas. The opening areas may decrease away from the sensor housing in the longitudinal extension direction. The inner protective tube may be connected to the middle protective tube at a front side, which faces away from the sensor housing. The inner protective tube may include a rectangular, in particular, square, cross-sectional shape with a cross section perpendicular to the longitudinal extension direction.

A particle is understood within the meaning of the present invention to mean, in particular, electrically conductive particles such as, for example, soot particles or dust particles.

Measuring electrodes are understood within the scope of the present invention to mean electrodes which are suitable for a voltage measurement.

A voltage measurement is understood within the scope of the present invention to mean a measurement, in which either a specific voltage is applied to the measuring electrodes and an electric current flow between the measuring electrodes is measured, or an electric current is applied to the measuring electrodes and a voltage between the measuring electrodes is measured. A voltage measurement may be, in particular, a resistance measurement, whereby a resistance through the measuring electrodes may be measured. A voltage controlled or voltage regulated measurement and/or a current controlled and/or current regulated measurement may take place, for example. The current and/or the voltage may be applied in the form of a continuous signal and/or also in the form of a pulsed signal. Thus, for example, a direct voltage and/or direct current may be applied and a current response or voltage response may be registered. Alternatively, a pulsed voltage and/or a pulsed current may be applied and a current response or a voltage response may be registered.

Interdigital electrodes are understood within the scope of the present invention to mean electrodes which are situated in such a way that they intermesh, in particular, intermesh in a comb-like manner.

An electrically insulating material is understood within the scope of the present invention to mean any material, which is suitable for preventing a current flow. Electrically insulating materials within the scope of the invention are understood, in particular, to mean in the form of a ceramic, which has a negligible electrical conductivity, even at higher temperatures, as they typically occur in exhaust gas systems of motor vehicles. Aluminum oxide, in particular, may be used in such case.

A layer is understood within the scope of the present invention to mean a uniform mass having an area extent with a certain height, which may be located on, under or between other components.

In accordance with the present invention, an inner protective tube having a particular design is provided, which divides an access of particles, for example, in a gas flow, to the surface of the sensor element in the area of the electrode system, in order to bring particles from the total gas flow entering the outer protective tube via the inner protective tube into the electrical near field along the entire electrodes and, ultimately, to the electrode structure itself. Thus, the entire electrode surface may be utilized to form signals, which is accompanied by a significant increase in sensitivity.

A triple protective tube, in particular, may be used in order to ensure an autonomy with respect to the different operating conditions resulting from the respective engine operating point, as well as to design the flow guidance in such a way that particles are able to pass preferably uniformly distributed along the entire length of the sensor electrodes (in the x-direction) up to the near field, by the particles experiencing an electrical and/or thermal attraction perpendicular to the main flow direction, i.e., in the z-direction, and are then attracted to the electrode surface or by the intermediate spaces, where they adhere and form a conductive path between two electrode fingers when acted upon for a sufficient length of time. By designing the inner protective tube with multiple flaps and openings along the entire area above the electrode structure (in the x-direction), the flow, and therefore, the particles, experience an acceleration also in the z-direction and are thus able to pass along the entire electrode structure into the electrical near field. The sensor element in this case may also be non-directionally installed. In this case, multiple flaps are mounted distributed over the circumference/cross section. However, a directional installation of the sensor element is advantageous with respect to maximally achievable sensitivity. In this case, it is sufficient to use only one flap along the circumference, each of which is located directly over the electrode surface of the sensor element. In the case of a directional installation of the sensor, a rectangular shaped inner protective tube may be used instead of a cylindrical tube.

In one preferred specific embodiment, the protective tube includes flaps having a stepped length, which result in a particularly uniform loading of the entire electrode surface. In another specific embodiment, no flaps are used for the inner protective tube, but rather holes of different, decreasing size in the direction of the front side are used. In addition, the inner and the middle protective tube are mechanically connected at the front side. As a result, the pressure ratios are adjusted in such a way that a uniform distribution of the gas flow and, thus, the particles, is likewise achieved. These holes may be punched, for example which, as a manufacturing technique, is simple to implement.

As an alternative to the variants discussed above, predominantly in the form of triple protective tubes, specific embodiments in the form of dual protective tubes are possible, which likewise enhance the sensor sensitivity by the dual protective tubes causing a segmentation of the gas flow and distribute particles preferably uniformly into the electrical near field specifically over the entire length of the electrode structure.

In such a variant, the flaps, which are introduced by punching and, therefore, form additional gas inlet holes on the side, are located in the inner protective tube. As a result of the flaps situated in parallel to the electrodes, the laminar flow over the sensor element is disturbed and, thus, it is ensured that soot particles are subsequently transported more rapidly into the near vicinity of the electrode field. At the same time, the heat capacity requirement of the probe at higher exhaust gas velocities is reduced as a result of the flaps, because a bypass effect occurs, in which the entire sample mass flow is no longer guided past the sensor element. In addition, the accumulation of soot particles is no longer a function of the exhaust gas velocity.

In another specific embodiment, the inner protective tube is provided with flaps, but without additional gas inlet holes. In this case, a strong deflection and restriction of the cross section forces a re-mixing of the flow, so that new particles are again able to arrive in the near vicinity of the sensor element for deposition by electrophoresis.

Alternatively, an inner protective tube without additional holes may be used, which tapers however toward the front side where the gas outlet hole is located. The tapering of the cross section causes particles to be drawn to the sensor element from layers which cannot be reached in the front section by electrophoresis.

BRIEF DESCRIPTION OF THE DRAWINGS

Additional optional details and features of the present invention result from the following description of preferred exemplary embodiments, which are schematically depicted in the figures.

FIG. 4 shows a longitudinal sectional view of a sensor for detecting particles according to a fourth specific embodiment of the present invention.

FIG. 5 shows a longitudinal sectional view of a sensor for detecting particles according to a fifth specific embodiment of the present invention.

FIG. 6 shows a cross-sectional view of the sensor according to the fifth specific embodiment.

FIG. 10 shows a longitudinal sectional view of a sensor for detecting particles according to a seventh specific embodiment.

FIG. 11 shows a longitudinal sectional view of a sensor for detecting particles according to an eighth specific embodiment of the present invention.

DETAILED DESCRIPTION OF EXAMPLE EMBODIMENTS

Figure 1:
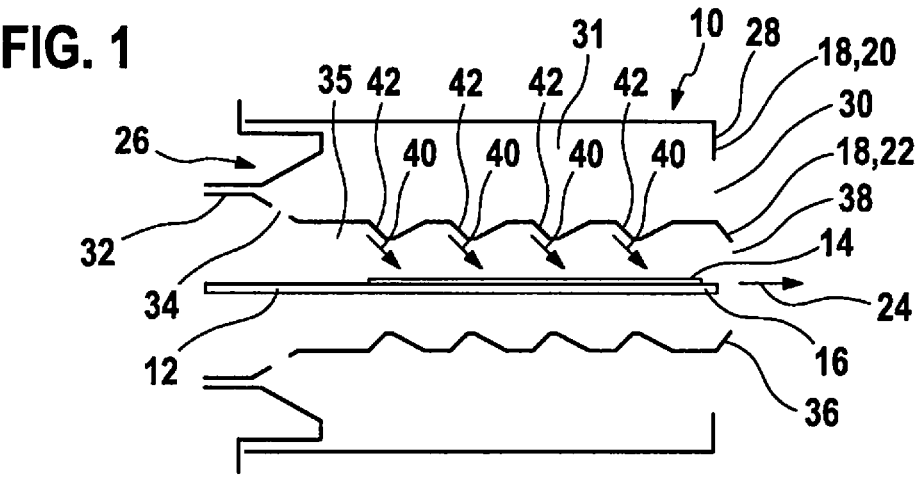
FIG. 1 shows a longitudinal sectional view of a sensor for detecting particles according to a first specific embodiment of the present invention.

FIG. 1 shows a longitudinal sectional view of a sensor 10 for detecting particles, in particular, soot particles in a gas flow such as, for example, an exhaust gas flow of an internal combustion engine, which is suited for installation in an exhaust gas system of a motor vehicle. Sensor 10 is designed, for example, as a soot sensor and situated preferably downstream from a soot particle filter of a motor vehicle having a diesel combustion engine. Sensor 10 includes a sensor element 12 having at least two measuring electrodes 14, which are situated on a carrier substrate 16. Carrier substrate 16 may be manufactured from a ceramic material such as, for example, silicon oxide and/or aluminum oxide and/or zirconium oxide. The measuring electrodes 14 may be situated on carrier substrate 16, in particular, as interdigital electrodes.

Sensor 10 also includes a protective tube assembly 18 having at least one outer protective tube 20 and one inner protective tube 22. Sensor element 12 is situated in inner protective tube 22 in a longitudinal extension direction 24. Outer protective tube 20 in this case surrounds inner protective tube 22. Sensor 10 also includes a sensor housing 26. Sensor element 12 is situated in such a way that it projects from sensor housing 26 in longitudinal extension direction 24.

Outer protective tube 20 and inner protective tube 22 are designed to permit particles to access sensor element 12, as is described in greater detail below. Thus, outer protective tube 20 includes access openings 30 on a front side 28, which faces away from sensor housing 26. Access opening 30 is designed, for example, as an annular gap. Particles are able to pass through access opening 30 into intermediate space 31 between outer protective tube 20 and inner protective tube 22. Inner protective tube 22 includes an access opening 34 at the rear end 32, which faces sensor housing 26, for permitting an access of particles out of intermediate space 31 formed between outer protective tube 20 and inner protective tube 22. Access opening 34 in this case may be angled with respect to longitudinal extension direction 24. Inner protective tube 22 includes an exit hole 38 on a front side 36, which faces away from sensor housing 26, for permitting the particles to exit out of the inner space 35 formed between inner protective tube 22 and sensor element 12. Inner protective tube 22 is designed, in particular, to permit particles to access sensor element 12 in a direction 40 deviating from longitudinal extension direction 24. In the exemplary embodiment shown, inner protective tube 22 includes flaps 42, which project in the direction of sensor element 12. Flaps 42 are angled relative to longitudinal extension direction 24. In this way, a flow of the particles, which passes through access openings 34 into inner space 35 between inner protective tube 22 and sensor element 12, and flows in the direction of exit hole 38, are deflected at flaps 42 in the direction of sensor element 12.

Figure 2:
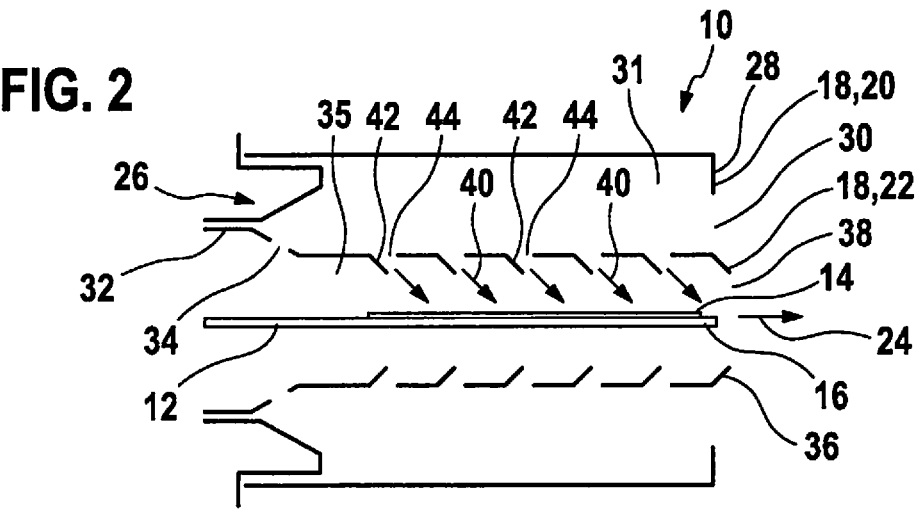
FIG. 2 shows a longitudinal sectional view of a sensor for detecting particles according to a second specific embodiment of the present invention.

FIG. 2 shows a longitudinal sectional view of a sensor 10 for detecting particles according to a second specific embodiment of the present invention. Only the differences with respect to the preceding specific embodiment are described below and identical components are provided with identical reference numerals. In sensor 10 of the second specific embodiment, inner protective tube 22 includes openings 44 adjacent to flaps 42. As a result, a portion of the particles arriving in intermediate space 31 already flows through openings 44 and is deflected at flaps 42 in the direction of sensor element 12. The remaining portion of the particles passes through access opening 34 into inner space 35 and, as in the first specific embodiment, when flowing in the direction of exit hole 38, is deflected at flaps 42 in the direction of sensor element 12.

Figure 3:
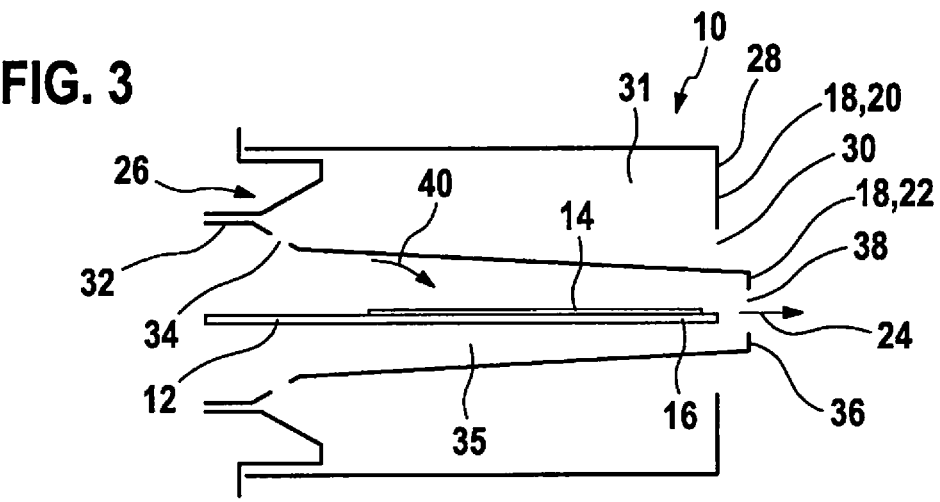
FIG. 3 shows a longitudinal sectional view of a sensor for detecting particles according to a third specific embodiment of the present invention.

FIG. 3 shows a longitudinal sectional view of a sensor 10 for detecting particles according to a third specific embodiment of the present invention. Only the differences with respect to the preceding specific embodiments are described below and identical components are provided with identical reference numerals.

Sensor 10 of the third specific embodiment includes no flaps. Instead, inner protective tube 22 tapers away from sensor housing 26 in longitudinal extension direction 24. Inner protective tube 22 tapers, in particular, uniformly, i.e., an inner diameter of inner protective tube 22 decreases uniformly away from sensor housing 26 in longitudinal extension direction 24. As a result of the gradual tapering of inner protective tube 22, a flow of the particles, which passes through access openings 34 into inner space 35 formed between inner protective tube 22 and sensor element 12 and flows in the direction of exit hole 38, is deflected in the direction of sensor element 12.

FIG. 4 shows a longitudinal sectional view of a sensor 10 for detecting particles according to a fourth specific embodiment of the present invention. Only the differences with respect to the preceding specific embodiments are described below and identical components are provided with identical reference numerals. Sensor 10 of the fourth specific embodiment is based on sensor 10 of the third specific embodiment. In this case, inner protective tube 22 of the third specific embodiment tapers non-uniformly. Thus, inner protective tube 22 has stepped taperings 46 so that the tube tapers in steps. As a result of stepped taperings 46 of inner protective tube 22, a flow of the particles, which passes through access openings 34 into inner space 35 formed between inner protective tube 22 and sensor element 12 and flows in the direction of exit hole 38, is deflected in the direction of sensor element 12.

FIG. 5 shows a longitudinal sectional view of a sensor 10 for detecting particles according to a fifth specific embodiment of the present invention. Only the differences with respect to the preceding specific embodiments are described below and identical components are provided with identical reference numerals. Sensor 10 of the fifth specific embodiment is based on sensor 10 of the second specific embodiment. Protective tube assembly 18 also includes a middle protective tube 48. Middle protective tube 48 includes an access opening 52 at a rear end 50, which faces sensor housing 26, for permitting the particles to exit from an intermediate space 49 between outer protective tube 20 and middle protective tube 48 in the direction of access opening 34 of inner protective tube 22. The particles pass through access opening 34 into an intermediate space 53 formed between middle protective tube 48 and inner protective tube 22. As indicated by arrows 54, the particles pass out of intermediate space 53 formed between middle protective tube 48 and inner protective tube 22 and through openings 44 adjacent to flaps 42 into inner space 35 of inner protective tube 22 and thus to sensor element 12.

FIG. 6 shows a cross-sectional view of sensor 10 of the fifth specific embodiment. Here, the section extends perpendicular to longitudinal extension direction 24. It is apparent from FIG. 6 that sensor element 12 need not be oriented in parallel to a row of flaps 42 in longitudinal extension direction 24. In this case, it may be said to be a non-directional installation of sensor element 12. Inner protective tube 22 in this case has an essentially circular cross section. It is also apparent that four rows 56 of flaps 42, for example, may be provided, which are spaced uniformly apart in the circumferential direction around longitudinal extension direction 24 and are each situated in longitudinal extension direction 24.

Figure 7:
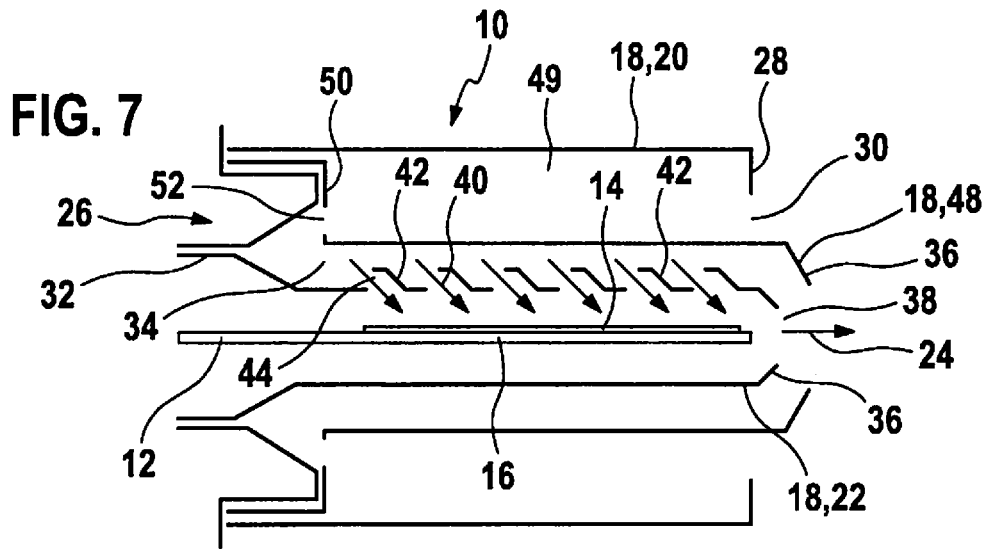
FIG. 7 shows a cross-sectional view of a sensor for detecting particles according to a sixth specific embodiment of the present invention.

FIG. 7 shows a longitudinal sectional view of sensor 10 for detecting particles according to a sixth specific embodiment of the present invention. Only the differences with respect to the preceding specific embodiments are described below and identical components are provided with identical reference numerals. Sensor 10 of the sixth specific embodiment is based on the sensor of the fifth specific embodiment. Sensor 10 of the sixth specific embodiment is designed in such a way that flaps 42 are situated on a section 58 of inner protective tube 22, which faces measuring electrodes 14. No flaps 42 and openings 44 are provided in the remaining sections of inner protective tube 22.

Figure 8:
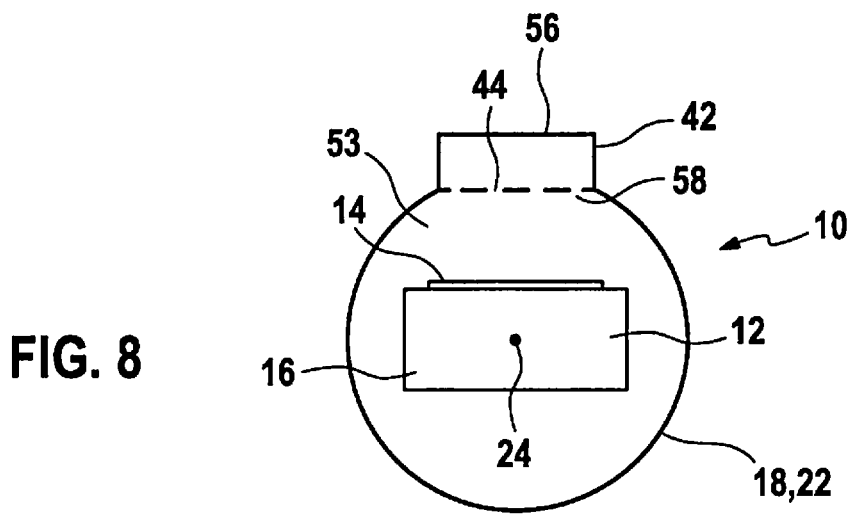
FIG. 8 shows another cross-sectional view of a sensor according to the sixth specific embodiment.

FIG. 8 shows a cross-sectional view of sensor 10 according to the sixth specific embodiment. The section extends perpendicular to longitudinal extension direction 24. FIG. 8 illustrates the embodiments of FIG. 7. It is clearly apparent that flaps 42 are situated only on section 58 of inner protective tube 22, which faces measuring electrodes 14, and otherwise no flaps 42 are provided in the circumferential direction.

Figure 9:
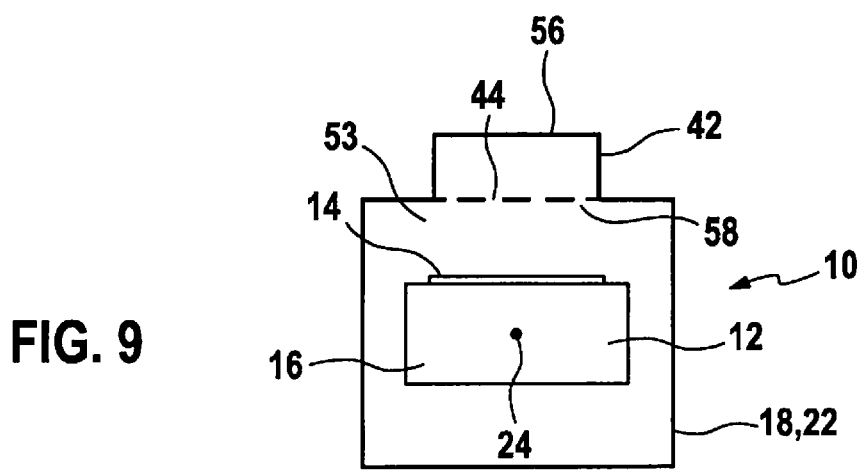
FIG. 9 shows a cross-sectional view of a modification of the sensor of the sixth specific embodiment.

FIG. 9 shows a cross-sectional view of sensor 10 according to a modification of the sixth specific embodiment. In this embodiment, inner protective tube 22 has a rectangular and, in particular, square cross-section. The cross section in this case is viewed perpendicular to longitudinal extension direction 24.

FIG. 10 shows a longitudinal sectional view of sensor 10 for detecting particles according to a seventh specific embodiment of the present invention. Only the differences with respect to the preceding specific embodiments are described below and identical components are provided with identical reference numerals. Sensor 10 of the seventh specific embodiment is based on sensor 10 of the fifth specific embodiment. Flaps 42 vary in length. The length of flaps 42 increases away from sensor housing 26 in longitudinal extension direction 24. In other words, those flaps 42 located further away from sensor housing 26 in longitudinal extension direction 24 are longer than those flaps 42 located closer to sensor housing 26.

FIG. 11 shows a longitudinal sectional view of sensor 10 for detecting particles according to an eighth specific embodiment of the present invention. Only the differences with respect to the preceding specific embodiments are described below and identical components are provided with identical reference numerals. Sensor 10 of the eighth specific embodiment is based on sensor 10 of the fifth specific embodiment. Instead of flaps 42, inner protective tube 22 includes openings 60. Openings 58, 60 have different opening areas. The opening areas decrease away from sensor housing 26 in longitudinal extension direction 24. In other words, those openings 60 located further away from sensor housing 26 in longitudinal extension direction 24 have smaller opening areas than those openings 60 located closer to sensor housing 26.

What is claimed is:

1. A sensor for detecting soot particles, comprising:
   a sensor element having at least two measuring electrodes which are situated on a carrier substrate; and
   a protective tube assembly having at least one outer protective tube and one inner protective tube, the sensor element being situated in the inner protective tube in a longitudinal extension direction, the outer protective tube and the inner protective tube being designed to permit the particles to access the sensor element, the inner protective tube being designed to permit the particles to access the sensor element in a direction deviating from the longitudinal extension direction,
   wherein an entire surface of the at least two measuring electrodes is uniformly acted upon by the particles,
   wherein the inner protective tube includes openings with differing opening areas,
   a sensor housing, wherein the sensor element protrudes from the sensor housing in the longitudinal extension direction, the inner protective tube including openings with differing opening areas, the opening areas decreasing away from the sensor housing in the longitudinal extension direction.

2. The sensor as recited in claim 1, wherein the inner protective tube includes flaps, which protrude in the direction of the sensor element.

3. The sensor as recited in claim 2, wherein the inner protective tube includes openings which are adjacent to the flaps.

4. The sensor as recited in claim 2, wherein the flaps are angled with respect to the longitudinal extension direction.

5. The sensor as recited in claim 2, wherein
   the flaps having different lengths relative to one another,
   the length of the flaps increasing away from the sensor housing in the longitudinal extension direction.

6. The sensor as recited in claim 2, wherein the flaps are situated on a section of the inner protective tube, which faces the measuring electrodes.

7. The sensor as recited in claim 1,
   wherein the inner protective tube tapers away from the sensor housing in the longitudinal extension direction.

8. The sensor as recited in claim 1, wherein the inner protective tube tapers uniformly or non-uniformly, in steps.

9. The sensor as recited in claim 1, further comprising:
   a middle protective tube situated between the outer protective tube and the inner protective tube.

10. The sensor as recited in claim 9, wherein the inner protective tube is connected to the middle protective tube on a front side, which faces away from the sensor housing.

11. The sensor as recited in claim 1, wherein the inner protective tube has a square cross-sectional shape with a cross section perpendicular to the longitudinal extension direction.

* * * * *